(12) United States Patent
Savard

(10) Patent No.: US 6,517,456 B1
(45) Date of Patent: Feb. 11, 2003

(54) FORCE COMPENSATION DEVICE FOR A CABLE CONTROL OF A GEARSHIFT FOR A CYCLE

(75) Inventor: Franck Savard, Planguenoual (FR)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/662,334

(22) Filed: Sep. 14, 2000

Related U.S. Application Data

(63) Continuation of application No. 09/214,122, filed as application No. PCT/FR96/01222 on Aug. 1, 1996, now abandoned.

(30) Foreign Application Priority Data

Aug. 3, 1995 (EP) .............................. 95450012
Sep. 27, 1995 (FR) .............................. 95/11579

(51) Int. Cl.[7] .............................................. F16H 59/00
(52) U.S. Cl. ...................................... 474/82; 74/500.5
(58) Field of Search .................. 74/501.5 R, 500.5; 474/79, 80, 81, 82

(56) References Cited

U.S. PATENT DOCUMENTS

| | | | |
|---|---|---|---|
| 3,442,148 A | * 5/1969 | Juy | .............................. 74/470 |
| 3,535,950 A | * 10/1970 | Shimano et al. | ......... 74/473.14 |
| 4,174,099 A | * 11/1979 | Yamasaki | ................... 267/168 |
| 4,267,742 A | 5/1981 | Cabeza | |
| 4,507,101 A | 3/1985 | Nagano | |
| 5,135,441 A | 8/1992 | Gelbien | |
| 5,613,405 A | 3/1997 | Kelley et al. | |
| 5,618,241 A | 4/1997 | Ose | |
| 5,699,884 A | 12/1997 | Koch et al. | |
| 5,728,018 A | 3/1998 | Terada et al. | |
| 5,890,979 A | 4/1999 | Wendler | |

FOREIGN PATENT DOCUMENTS

| | | |
|---|---|---|
| DE | 689 783 | 4/1940 |
| DE | 3200562 | 7/1983 |
| DE | 3400432 | 7/1985 |
| EP | 0423779 | 4/1991 |
| FR | 796583 | 4/1936 |
| WO | WO 9632316 | 10/1996 |

* cited by examiner

Primary Examiner—David A. Bucci
Assistant Examiner—Vicky A. Johnson
(74) Attorney, Agent, or Firm—Young & Thompson

(57) ABSTRACT

A force compensation device is provided in a cable control for at least one chain derailleur secured to a bicycle frame for operating a chain ring or a chain gear. The control cable is secured at a first end to the derailleur and at a second end to a control member that may be a lever, a handle or rotating grip. The derailleur includes a return spring returning to a compressed state when the chain is on the largest chain ring or gear. The control member includes at least one counter-acting elastic restoring element that is in the relaxed state when the return spring of the derailleur is in the compressed state. The counter-acting elastic restoring element is disposed between a fixed stop secured to the bicycle frame and a fixed stop secured to the second end of the cable.

3 Claims, 5 Drawing Sheets

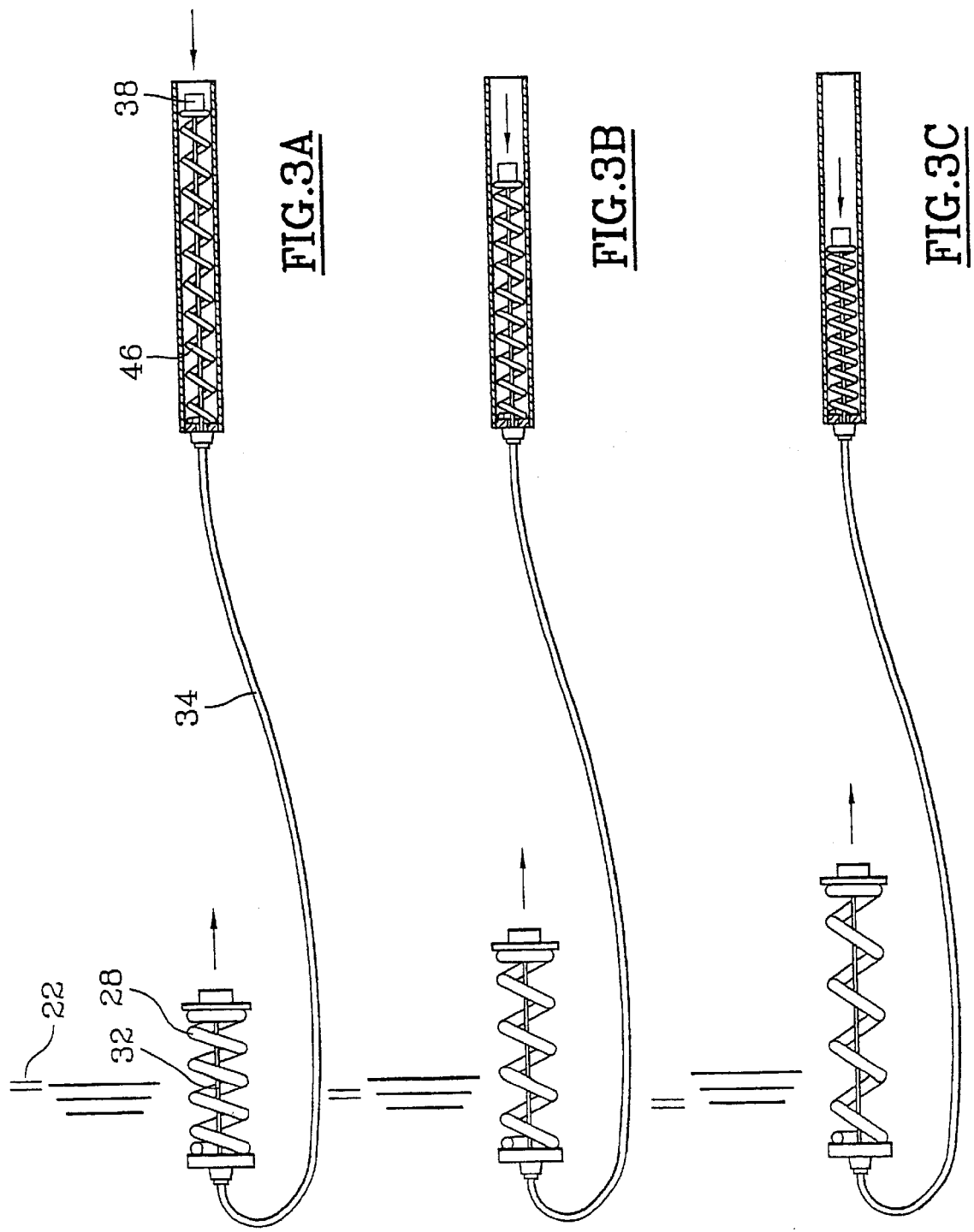

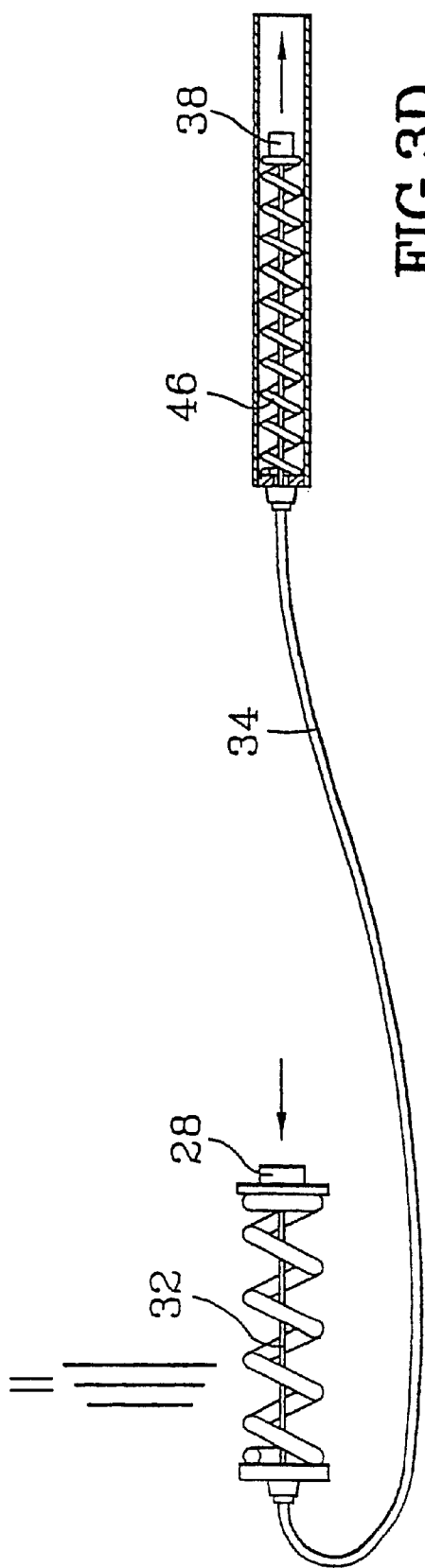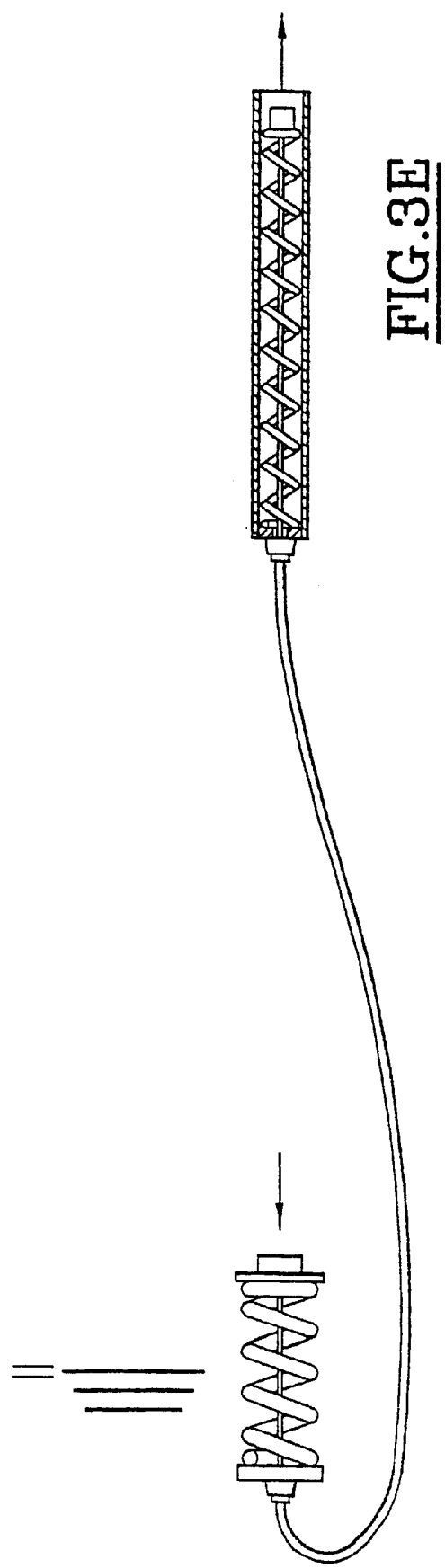

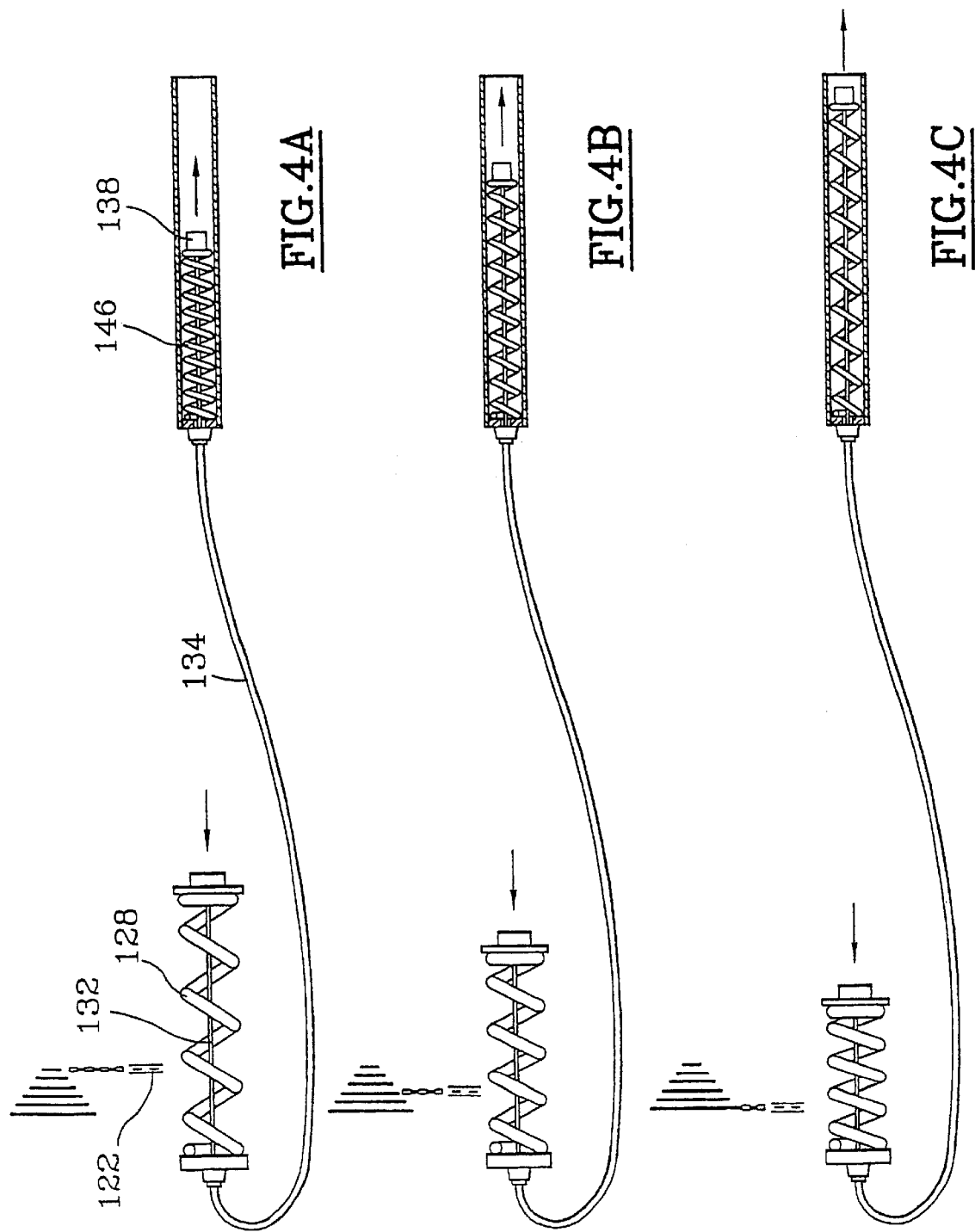

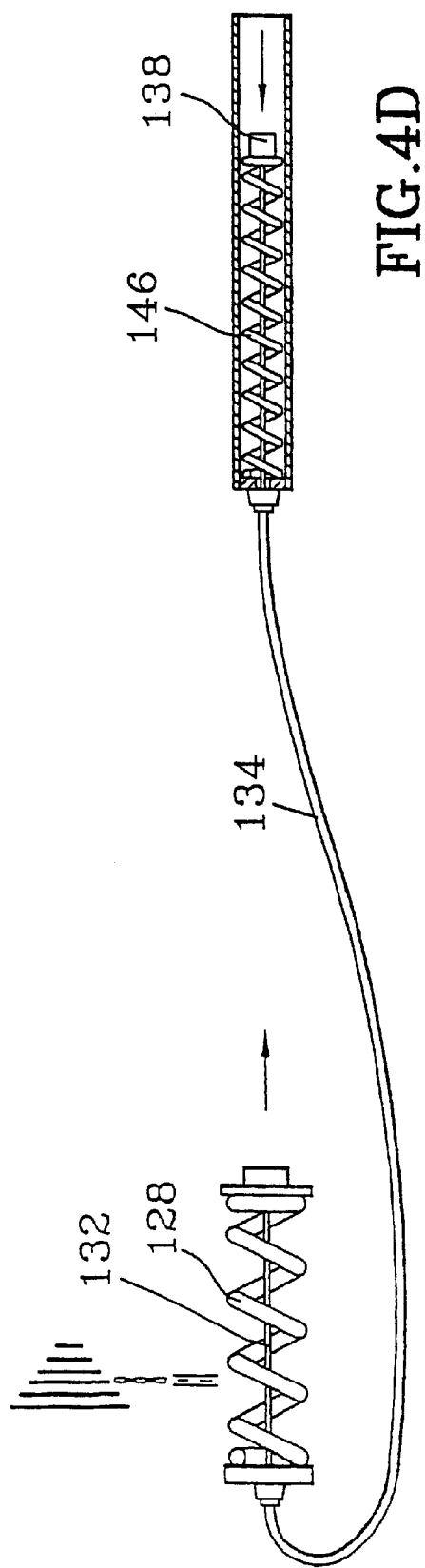
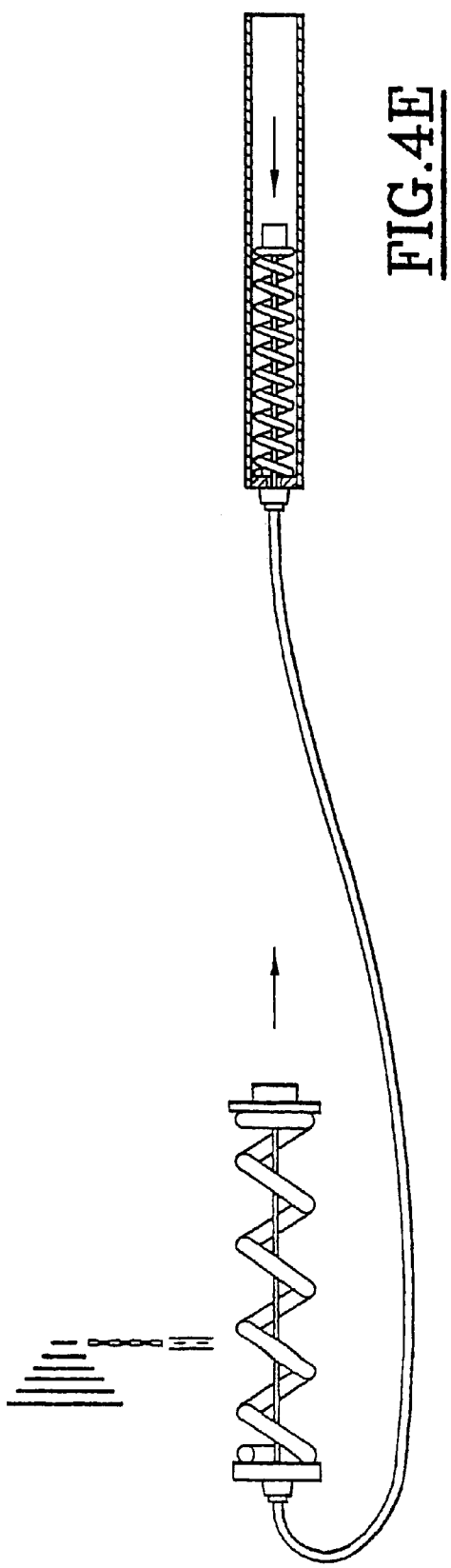

FORCE COMPENSATION DEVICE FOR A CABLE CONTROL OF A GEARSHIFT FOR A CYCLE

This application is a continuation of Ser. No. 09/214,122 filed Dec. 28, 1998 abandoned which is a 371 of PCT/FR96/01222 filed Aug. 1, 1996.

BACKGROUND OF THE INVENTION

The present invention concerns a force compensation device for a cable control of a gearshift for a cycle.

There currently exist speed change units of the type including:
- a control device, such as an operating handle, lever or even a rotating handle secured to the frame immediately close to the handlebar and able to be maneuvered by the user,
- a control cable, and
- a gearshift composed of a plate secured to the frame, a mobile parallelogram type element for guiding the chain able to be moved laterally, and a spring for bringing this mobile guiding element into one of the extreme positions.

In the case of a rear gearshift ensuring the change of gears, the mobile element is a deformable parallelogram which deviates from the hub bearing the gears under the recall effect of the spring and which moves closer to it under the traction action of the cable when the user exerts pressure on the control device.

In the case of gears, the jump from one gear to the other for changing up the smallest to the largest remains with a relatively slight amplitude as the gears are fully stepped, with the result that, although difficult, the force still remains reasonable, but it is necessary to stretch the recall spring so that on return it can free the stored energy.

In plates, the case is otherwise. The smallest plate is on the side of the frame, and the guiding element, also in the form of a deformable parallelogram, is brought back to the frame and the maneuver member is activated by the user so as to move from the smallest to the largest plate. The difference of diameter is here much larger and the force to be provided is much greater.

In addition, it is to be noted that when the user wants to move from the largest plate to the lower plate, it is firstly necessary to mount the chain beyond the diameter of the large plate in question at the top of the teeth and no longer at the throat bottom, which requires an additional force when one is clearly looking for a means to reduce the force to be provided. This means having to provide a high-capacity elastic spring so as to resolve the corresponding difficult point.

As regards lifting a lower plate towards a higher plate, the user is obliged to overcome this difficult point and secondly he needs to compress the spring which requires that strong forces be exerted on the operating handle, lever or rotating handle to the detriment of accuracy of movement, attention when riding or concentration during a competitive race. It has even been observed that this becomes prohibitive for children or certain persons possessing moderate physical strength. In all cases, it is certain that the user tends to add a movement of the body to compensate which more or less makes him lose his balance and when this maneuver of the gearshifts is effected dozens of times, indeed several hundreds of times when going for a trip, one can understand the advantage in being able to control the required maneuver force.

SUMMARY OF THE INVENTION

The aim of the invention is to offer a force compensation device for a cable control of a gearshift for a cycle which favours user actions by balancing the actions, both for the change of speeds up and down, which reduces costs, is adaptable to existing systems, has little effect on the weight, occupies a smaller amount of space and is fully able to be integrated, both from the ergonomic and aesthetic points of view.

To this effect, the force compensation device of the invention for a cable control of at least one chain gearshift secured to the frame of a cycle with several plates and/or gears, the cable including an extremity integral with the gearshift and an extremity integral with a control device with a lever, handle or rotating handle generating a translation movement, this cable sliding into a sheath in support on a stop, the gearshift being equipped with a recall spring in a compressed state when the chain is on the largest plate or gear, wherein it includes at least one elastic element with an antagonistic recall effect disposed between a fixed stop integral with the cycle and a fixed stop integral with the cable, the elastic recall element being in a slackened state when the recall spring of the gearshift is in the compressed state and the recall element being in the compressed state when the recall spring of the gearshift is the slackened state.

This device is characterised in that the elastic recall element is a compensation spring disposed coaxial to the cable and inserted between a fixed stop integral with the frame and the extremity of this cable.

According to another characteristic, the compensation spring is a spring with a small diameter and a large number of contiguous spires in a compressed state, the force to compress it or the force restored being approximately equal to the force to compress or the force restored by the recall spring of the gearshift.

In the case of a monocontrol, the device of the invention includes two independent springs, each acting on the corresponding cable so as to obtain a compensation of the forces in all circumstances.

According to a particular embodiment, the compensation spring is integrated in an extension of the control member.

More specifically, in the case of a control member with a rotating handle, the compensation spring is a housing produced with the fixed handle grip.

BRIEF DESCRIPTION OF THE DRAWINGS

The invention is described hereafter according to a particular nonrestrictive embodiment with reference to the accompanying drawings on which:

FIGS. 3A to 3E are synoptic diagrams of the stages for operating a gearshift with plates with the compensation device of the invention, and FIGS. 4A to 4E are synoptic diagrams of the stages for operating a gearshift with gears with the compensation device of the invention.

DESCRIPTION OF THE PREFERRED EMBODIMENTS

Figure 1:
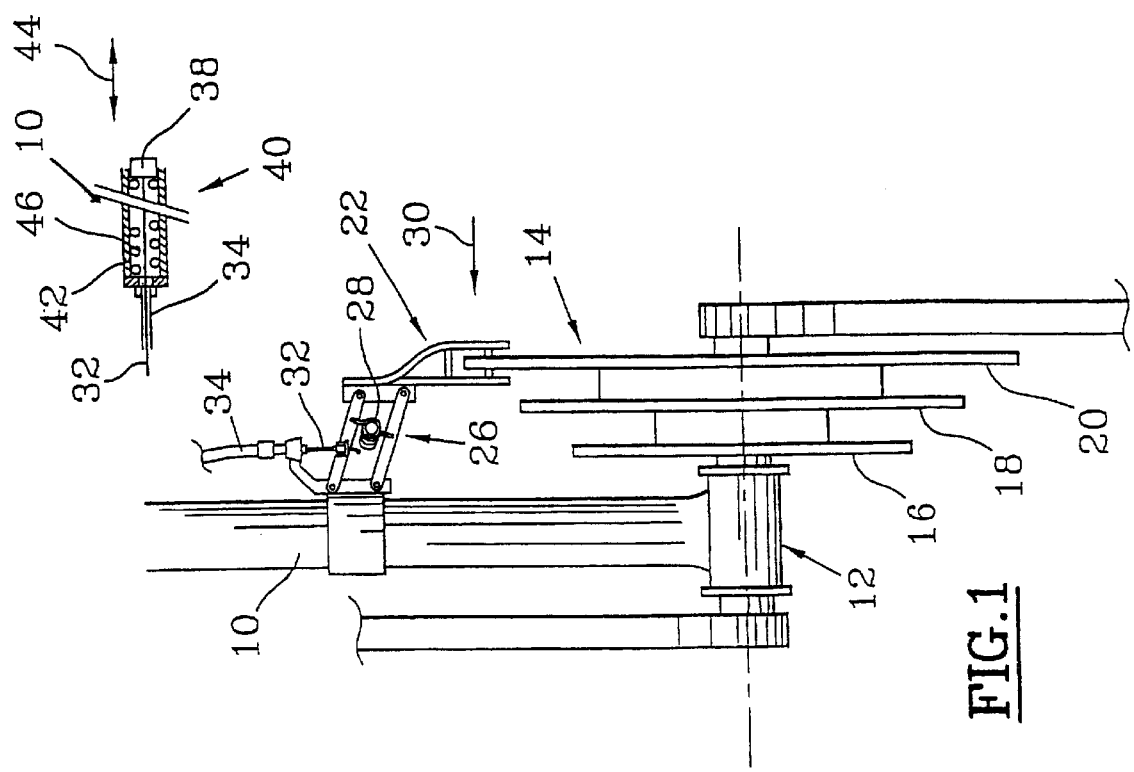
FIG. 1 is a simplified view of a gearshift with plates.

FIG. 1 shows a portion of the frame 10 of a cycle in which a crank gear 12 is mounted which drive plates 14, namely 3 in the example shown.

These plates include a small plate 16, an intermediate plate 18 and a large plate 20 disposed so that the small plate is inside, that is close to the frame, and the large plate outside, that is distanced from the frame.

This disposition is generally adapted as it is dictated by the combination with the gears, whose fitting is inverted as shall be explained later, so as to ensure the chain is properly aligned at the time of the greatest forces, that is for the smallest ratio, small plate/large gear, and for the largest ratio, large plate/small gear.

The unit is completed with a front gearshift 22 including a mobile arm 26 formed of a deformable parallelogram with a spring 28 for return in the direction of the arrow 30, that is from outside to inside, and a control cable 32 sliding into a sheath 34, one of the extremities of this cable being connected to the mobile arm.

The other extremity 38 of this cable is connected to control means shown diagrammatically at 40 in the form of a fixed stop 42 of the sheath 34 and in the form of an arrow 44 representative of the movement generated in the two directions by a lever, operating handle or a rotating handle. The fixed stop 42 is integral with the frame 10 of the bicycle.

The compensation means include a compensation spring 46 inserted between the stop 42 and the extremity 38 of the cable 32. This spring is more particularly selected with a large number of turns and with slight stiffness so that the force required for its compression is progressive and slight, whereas the resultant recall force is approximately equal to that of the recall spring 28 of the front gearshift 22. This recall spring 28 preferably has contiguous turns in a compressed condition.

The functioning of these compensation means is shown hereafter with reference to FIGS. 3A to 3E. On these figures, the recall spring 28 is shown as a compression spring so as to facilitate understanding.

When the user pedals with a large ratio and when the chain is thus on the large plate (FIG. 3A), the recall spring 28 of the mobile arm 26 of the front gearshift 22 is in the compressed state, that is when the user has exerted a traction on the cable 32 and the compensation spring 46 is in the slackened state.

When the user wishes to reduce his ratio (see FIG. 3B), he maneuvers the control so as to go down from one plate and the chain is then located on the intermediate plate 18. To carry out this movement, the user activates the control device, lever, handle or rotating handle so as to release the cable over a given length. At the time of this action, the recall spring 28 is partially freed and restores a portion of the stored energy, whereas it is necessary to compress the compensation spring 46 rendered easier via the actual characteristics of said spring. In addition, as regards the excess energy it frees, the recall spring 28 also takes part in compression of the compensation spring 46.

When the user wishes to reduce the ratio even further, he lowers the chain onto the small plate 16 by maneuvering the lever, control handle or rotating handle again so as to further release a given cable length.

Thus, when the user carries out the reverse cycle (see FIGS. 3D and 3E), the recall spring 46 helps the user to compress the spring 28 of the front gearshift 22.

Figure 2:
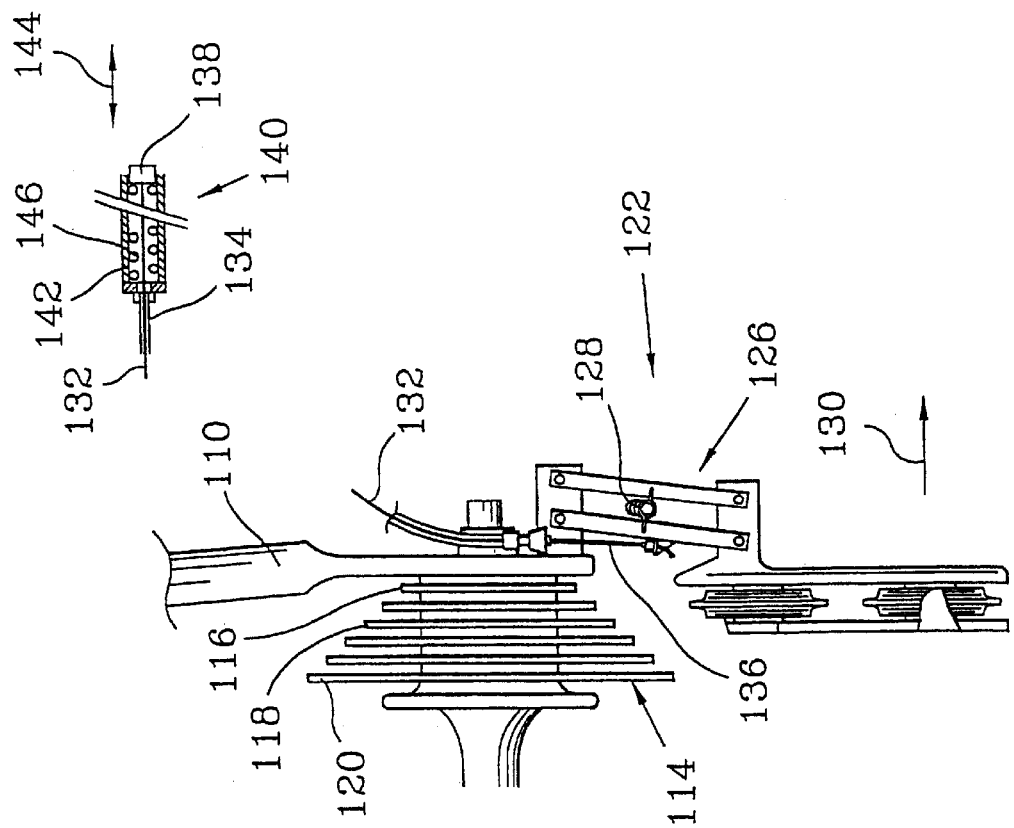
FIG. 2 is a simplified view of a gearshift with gears.

As regards the rear gearshift 122, the disposition symmetry is shown on FIG. 2.

Identical elements bear the same references increased by 100.

Functioning is idenitical in that when the chain is on the smallest pinion 116, the spring 128 of the mobile arm 126 is slackened and the compensation spring 146 is compressed.

On the other hand, the effect on the gears is inverted since the passage from the large pinion onto the small gear increases the ratio contrary to the case with the plates.

When the user is on the largest gear, that is with the smallest gear so as to reduce this ratio he needs to change up gears and in order to do this, it exerts a traction on the cable so as to compress the recall spring 128, and at the same time the energy stored by the compensation spring 146 helps the user via a partial spring-back of said spring. This is represented on FIG. 4B with respect to FIG. 4A.

The user is then able to carry out the ratio modifications by exerting additional tractions on the cable to obtain the position shown on FIG. 3C.

FIGS. 4D and 4E show stages which are opposite the preceding stages.

Thus, the assistance device of the invention makes it possible to leave the recall spring of each of the gearshifts to act as it should and on the other hand facilitates movements by distributing the forces, that is stores the energy and restores it whenever needed to help the user.

This distribution is advantageous when the two controls of the front and rear gearshifts are paired or more precisely controlled by a given lever, control handle or rotating handle with means to generate a differential movement between the two cables of the gearshifts. In fact, in this case, compensation allows for a smooth control of the unit, whereas the forces to be exerted on the common control member could prove to be significant to the point of leading to a somewhat difficult maneuver.

For a rotating handle with or without a paired control, the compensation spring is advantageously housed in a housing produced with the fixed handle grip of the handle in the prolongation of the cable outlet.

As regards the control device, it is essential that the cable is integral with the activation member so as to obtain a pushed or pulled effect as the recall spring of the gearshift does not ensure a strong traction of the cable.

What is claimed is:

1. A force compensation device for a chain derailleur secured to a frame of a bicycle with at least several chainrings or gears, the device comprising:

a cable with a first end secured to the derailleur and a second end in a maneuvering member that is attached to the frame of the bicycle and that generates a translation movement of said second end of said cable, said cable sliding in a sheath;

a return spring in the derailleur that acts on said first end of said cable and that is in a compressed state when a chain of the derailleur is on a largest one of the chainrings or gears;

said maneuvering member comprising at least one counter-acting elastic restoring element that acts on said second end of said cable and that is arranged to be in a relaxed state when said return spring of the derailleur is in the compressed state and in a compressed state when said return spring of the derailleur is in a relaxed state; and wherein said counter-acting elastic restoring element is disposed between a first fixed stop in said maneuvering member and a second stop secured to said second end of said cable.

2. The device according to claim 1, wherein said elastic restoring element is a compensation spring disposed coaxially with said cable.

3. The device according to claim 2, wherein said compensation spring is a spiral spring, which has contiguous turns when in said compressed state, a force for compressing said spiral spring or a restored force in said spiral spring being substantially equal to a force for compressing or a force restored by said return spring of said derailleur.

* * * * *